United States Patent
Yi et al.

(10) Patent No.: US 7,959,884 B2
(45) Date of Patent: Jun. 14, 2011

(54) APPARATUS FOR PURIFYING AIR AND PURIFYING METHOD THEREOF

(75) Inventors: Hun-Jung Yi, Suwon-si (KR); Seung-Ki Cha, Seoul (KR); Chang-su Lim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/619,144

(22) Filed: Nov. 16, 2009

(65) Prior Publication Data
US 2010/0158778 A1   Jun. 24, 2010

(30) Foreign Application Priority Data
Dec. 23, 2008 (KR) .................. 10-2008-0131936

(51) Int. Cl.
*B01D 53/56* (2006.01)
*B01D 53/74* (2006.01)
(52) U.S. Cl. .......... 423/235; 423/DIG. 1; 422/129; 422/168; 422/186.21; 422/187; 204/179
(58) Field of Classification Search .......... 423/235, 423/DIG. 1; 422/129, 168, 186.21, 187; 204/179
See application file for complete search history.

(56) References Cited

U.S. PATENT DOCUMENTS

| | | | | | |
|---|---|---|---|---|---|
| 4,287,040 | A | * | 9/1981 | Alamaro | 204/179 |
| 6,117,403 | A | * | 9/2000 | Alix et al. | 423/210 |
| 6,132,692 | A | * | 10/2000 | Alix et al. | 423/210 |
| 7,368,094 | B2 | * | 5/2008 | Cho et al. | 423/213.2 |

FOREIGN PATENT DOCUMENTS

| | | |
|---|---|---|
| JP | 11-319486 | 11/1999 |
| KR | 1020020026323 | 4/2002 |
| KR | 1020070077731 | 7/2007 |

* cited by examiner

*Primary Examiner* — Timothy C Vanoy
(74) *Attorney, Agent, or Firm* — F. Chau & Associates, LLC

(57) ABSTRACT

An air purifying apparatus includes an air flow generating device for generating a flow of air, a nozzle spraying water to the air flowing through the air flow generating device, a plasma module performing a plasma reaction on the air containing the water sprayed from the nozzle, and oxidizing NOx in the air and converting it into $NO_3$, an eliminator eliminating the $NO_3$ converted in the plasma module and the water contained in the air and passing pure air through the eliminator and out of the air purifying apparatus and a water tank storing the water received from the eliminator, thereby heightening the removal efficiency of NOx from the air.

17 Claims, 7 Drawing Sheets

APPARATUS FOR PURIFYING AIR AND PURIFYING METHOD THEREOF

CROSS-REFERENCE TO RELATED APPLICATIONS

This application claims priority to Korean Patent Application 10-2008-0131936, filed on Dec. 23, 2008, the disclosure of which is hereby incorporated by reference herein in its entirety.

BACKGROUND (i) Technical Field

The inventive concept relates to an air purifying apparatus and to an air purifying method thereof, and more particularly, to an air purifying apparatus capable of removing NOx from air by using a plasma reaction.

(ii) Description of the Related Art

There is currently ongoing research to prevent defects in wafer manufacturing processes and to increase the production yield of semiconductor devices as semiconductor technology rapidly advances. Consequently, as a result, it may be also necessary to increase the air purification level of a clean room due to the fact that the air purification level of a clean room may significantly influence the production yield of semiconductor devices.

In conventional air purification processes air supplied into the clean room may be purified by removing diverse chemicals including dust in the atmosphere by using various kinds of air purifying apparatuses. For example, a water shower system in the conventional art is currently mainly used as an air purifying apparatus and is configured to contact chemicals, such as for example, $NH_3$, SOx and NOx, with water and then filter these chemicals from the air.

In addition, with the above-mentioned conventional air purification processes, the water supplied to remove the chemicals, $NH_3$, SOx and NOx is managed through PH level. which indicates acidity or basicity. In examples of the relatively highest removal efficiency of air purification processes of the conventional art, a water-soluble level for $NH_3$ and SOx is relatively high and thus the removal efficiency therefor is high, but NOx has a low solubility and thus the efficiency thereof is checked as 10% or below. Therefore, NOx may be very difficult to remove by an air purifying apparatus of the conventional art and thus NOx may be supplied into the clean room thereby adversely affecting the air purification level of the clean room and the production yield of semiconductor devices.

Thus, there is a need in the art for an air purifying apparatus and an air purifying method thereof capable of heightening the removal efficiency of NOx contained in air.

SUMMARY

Some embodiments of the inventive concept may provide an air purifying apparatus and an air purifying method thereof capable of heightening a removal efficiency of NOx contained in air.

In accordance with an embodiment of the inventive concept, an apparatus for purifying air is provided. The apparatus includes an air flow generating device for generating a flow of air, a nozzle spraying water to the air flowing through the air flow generating device, a plasma module performing a plasma reaction on the air containing the water sprayed from the nozzle, and oxidizing NOx in the air and converting it into $NO_3$, an eliminator eliminating the $NO_3$ converted in the plasma module and the water contained in the air and passing pure air through the eliminator and out of the air purifying apparatus, and a water tank storing the water received from the eliminator.

The plasma module may generate a low-temperature atmospheric-pressure plasma reaction, and may comprise a dielectric barrier reactor or a pulse corona reactor.

The $NO_3$ may be collected by dissolving it in the moisture of the air.

In accordance with another embodiment of the inventive concept, a method of removing NOx is provided. The method includes converting the NOx in air into $NO_3$ through a plasma reaction and then subsequently removing the $NO_3$ from the air.

In accordance with another embodiment of the inventive concept, a method of purifying air is provided. The method includes generating a flow of air, spraying water to the air, performing a plasma reaction on the air containing the water, and oxidizing NOx in the air and converting it into $NO_3$ and eliminating the water and the $NO_3$ contained in the air and passing pure air.

Accordingly, with embodiments of the inventive concept, air undergoes a plasma reaction, thereby efficiently removing NOx from the air.

BRIEF DESCRIPTION OF THE DRAWINGS

The inventive concept will become more fully understood from the detailed description given hereinbelow and the accompanying drawings which are given by way of illustration just, and thus are not limitative of the inventive concept, and wherein.

DETAILED DESCRIPTION OF THE EMBODIMENTS

Embodiments of the inventive concept now will be described more fully hereinafter with reference to the accompanying drawings, in which embodiments of the inventive concept are shown. The inventive concept may, however, be embodied in many different forms and should not be construed as limited to the embodiments set forth herein.

An air purifying apparatus and an air purifying method thereof according to an embodiment of the inventive concept are described as follows.

Function and operation according to an embodiment of the inventive concept are first described more in detail referring to FIGS. 1 to 6, as follows.

Figure 1:
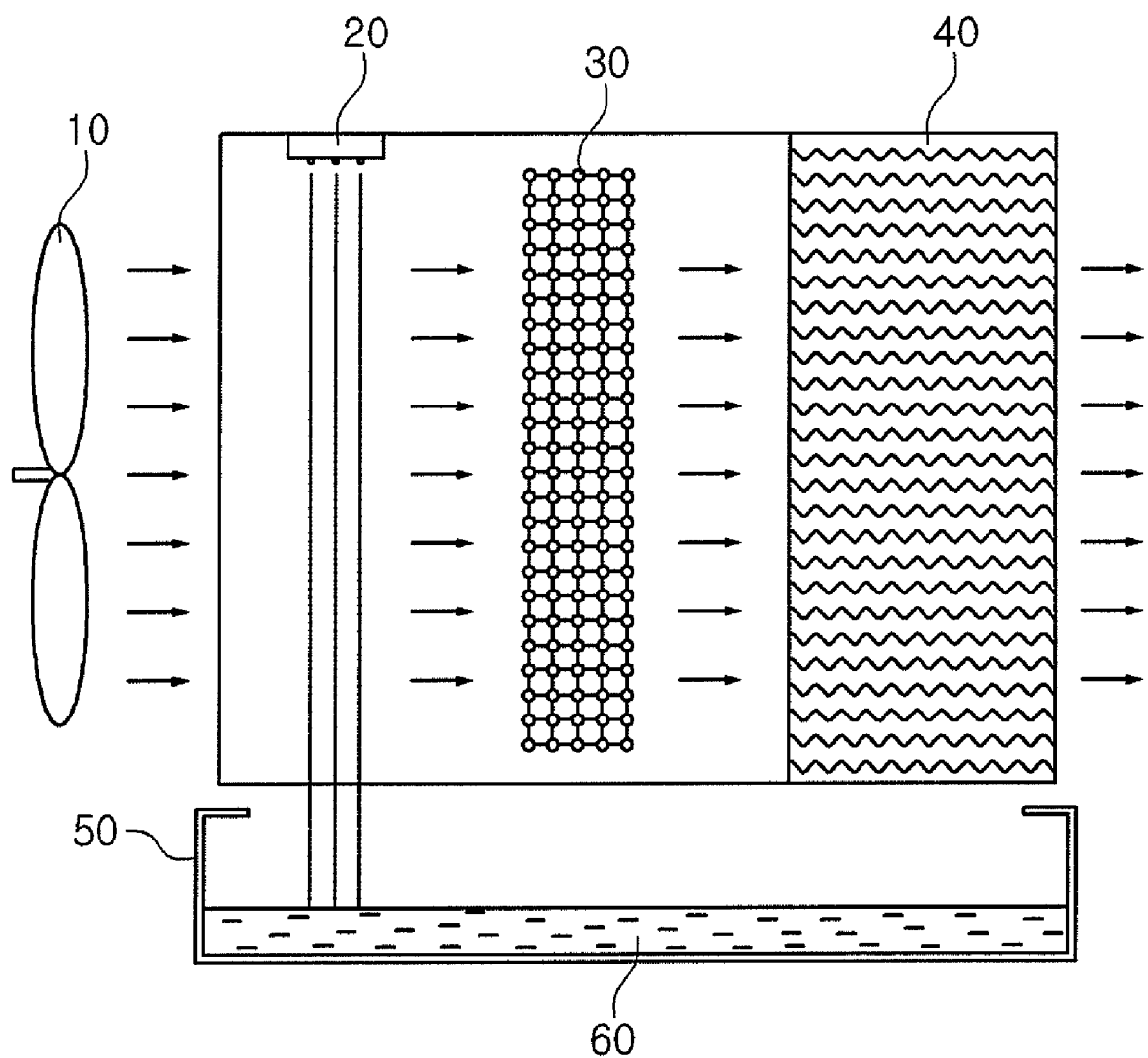
FIG. 1 schematically illustrates an air purifying apparatus according to an embodiment of the inventive concept.

FIG. 1 schematically illustrates an air purifying apparatus according to an embodiment of the inventive concept. As shown in FIG. 1, in the air purifying apparatus according to an embodiment of the inventive concept, air containing NOx is plasma reacted in a plasma module 30 and thus the NOx is converted into $NO_3$ having a high water-solubility, thereby removing it. At this time, air flowing in a given pressure from an air flow generating device such as, for example, a fan 10 is passed through water 60 sprayed from a nozzle 20, thereby eliminating $NH_3$ and SOx therefrom. The nozzle 20 may be referred to as a water shower system, and spray water 60 as a fog type spray to the air. At this time, the air may have very high humidity through increased moisture. Therefore, the surface area of the water 60 sprayed through the nozzle 20 may be relatively large, thereby causing the melting and the removal of SOx and $NH_3$ having a relatively high water-solubility from the air. However, NOx may be hardly removed because of a relatively low water-solubility.

NOx in air mostly exists as nitrogen monoxide and nitrogen dioxide. The above-mentioned components of NOx are pollution materials of the air generated when nitrogen in the air reacts with oxygen at a relatively high temperature in a device such as an automobile engine. Nitrogen monoxide is mainly generated through combustion and then is discharged into the atmosphere and oxidized into nitrogen dioxide. Nitrogen dioxide may be very harmful to the lungs and organs of the human body. Therefore, air supplied into a clean room should be provided after removing NOx therefrom.

Accordingly, in the air purifying apparatus according to an embodiment of the inventive concept, NOx is excited into a plasma state and converted into $NO_3$ by using the plasma module 30, and then melts in moisture of air and thus is produced into $HNO_3$ and then removed.

In the plasma module 30, air of the atmosphere undergoes the plasma reaction at relatively low-temperature (e.g. a normal temperature) and atmospheric-pressure. The plasma module 30 may be largely classified as a dielectric barrier reactor 30a or a pulse corona reactor 30b.

Figure 2:
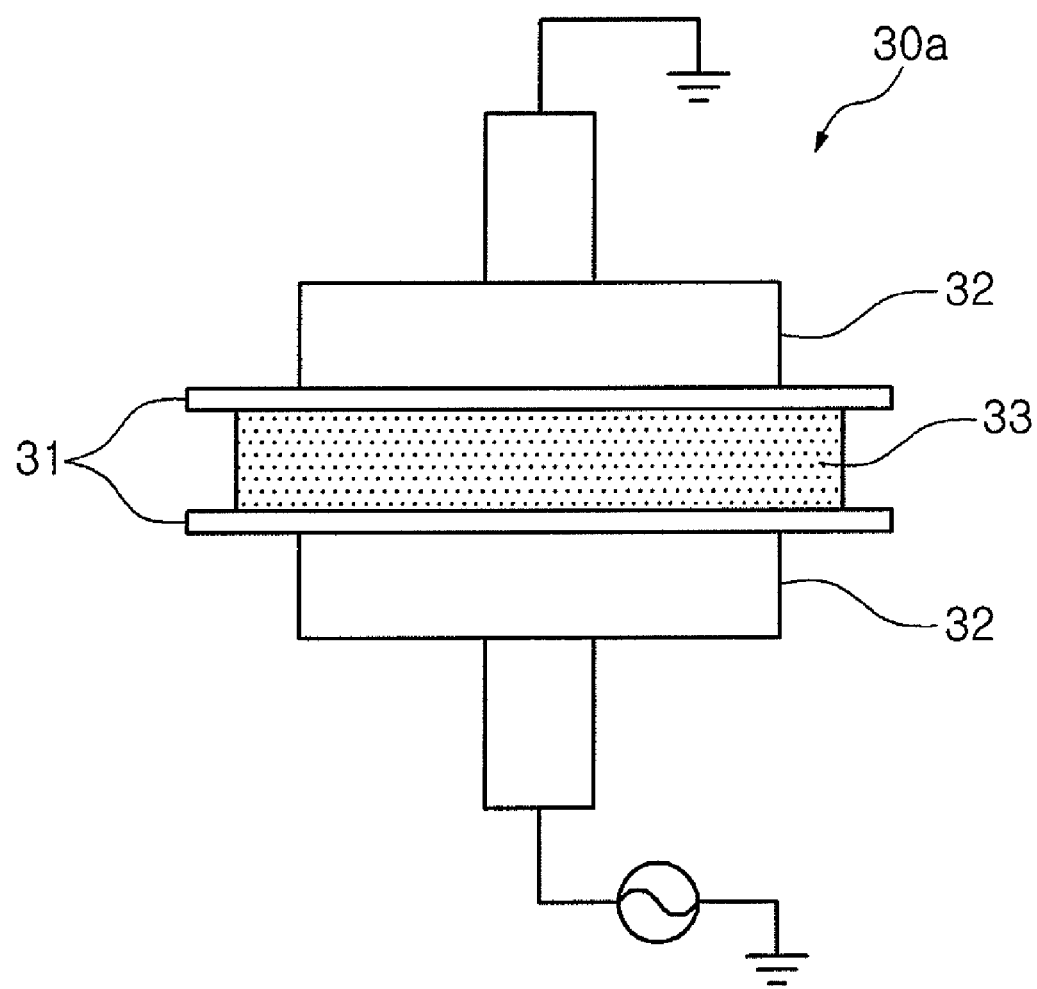
FIG. 2 is a cross-sectional view of a dielectric barrier reactor.

FIG. 2 is a cross-sectional view of a dielectric barrier reactor 30a. In the dielectric barrier reactor 30a, a dielectric 31 is installed in one or all of a plurality of discharge electrodes 32 having a given gap therebetween. When ionization occurs at one position point, transported-charges may be built up on the dielectric 31. A uniform glow discharge 33 may be obtained by substantially increasing the efficiency of the voltage applied by alternate current through the use of a charge build-up effect of the dielectric 31.

Electrical fields caused by such charges may reduce an electrical field induced between the plurality of electrodes 32, and after a lapse of several nanoseconds, a flow of current may be cut off. A current pulse duration time depends upon pressure and an ionization characteristic of gas and a characteristic of the dielectric 31. The dielectric 31 may have two functions. In the dielectric 31, a decided charge amount may be controlled by using a microdischarge and the microdischarge is dispersed entirely in the electrode 32. An atmospheric-pressure plasma reaction has a density of a radical higher by about 100 to about 1000 times than an existing vacuum plasma, and has a relatively low temperature of normal temperature to about 150° C.

One of significant characteristics in such mechanism is that there exists a microdischarge through a streamer with a relatively high current density locally in a space of the discharge. The streamer is used in an ozonator generating a large amount of ozone that oxidizes NOx of air in the atmosphere. Ozone can be generated by oxygen of air, and can oxidize NOx and convert it into $NO_3$ having a relatively high water-solubility.

Therefore, in the air purifying apparatus according to embodiment of the inventive concept, NOx is oxidized by using ozone generated in the dielectric barrier reactor 30a and thus $NO_3$ having a relatively high water-solubility is produced and then the $NO_3$ can be removed through the eliminator.

Figure 3A:
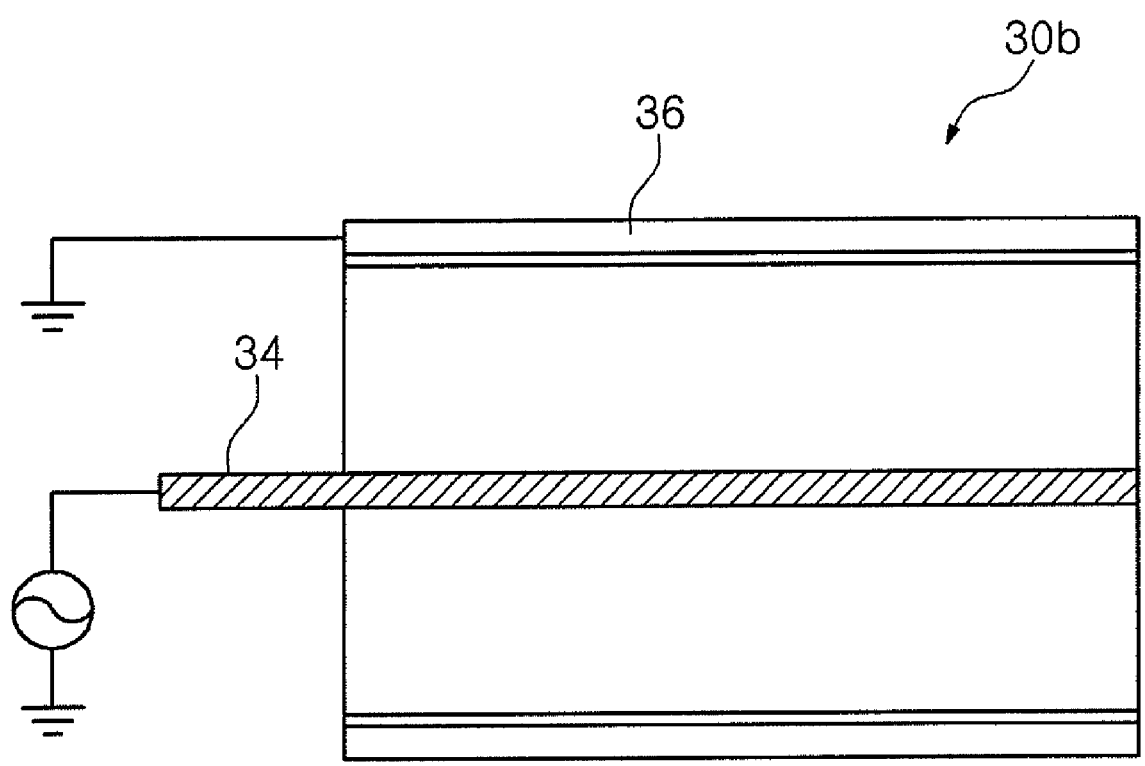
FIGS. 3A and 3B are cross-sectional views illustrating a pulse corona reactor.
Figure 3B:
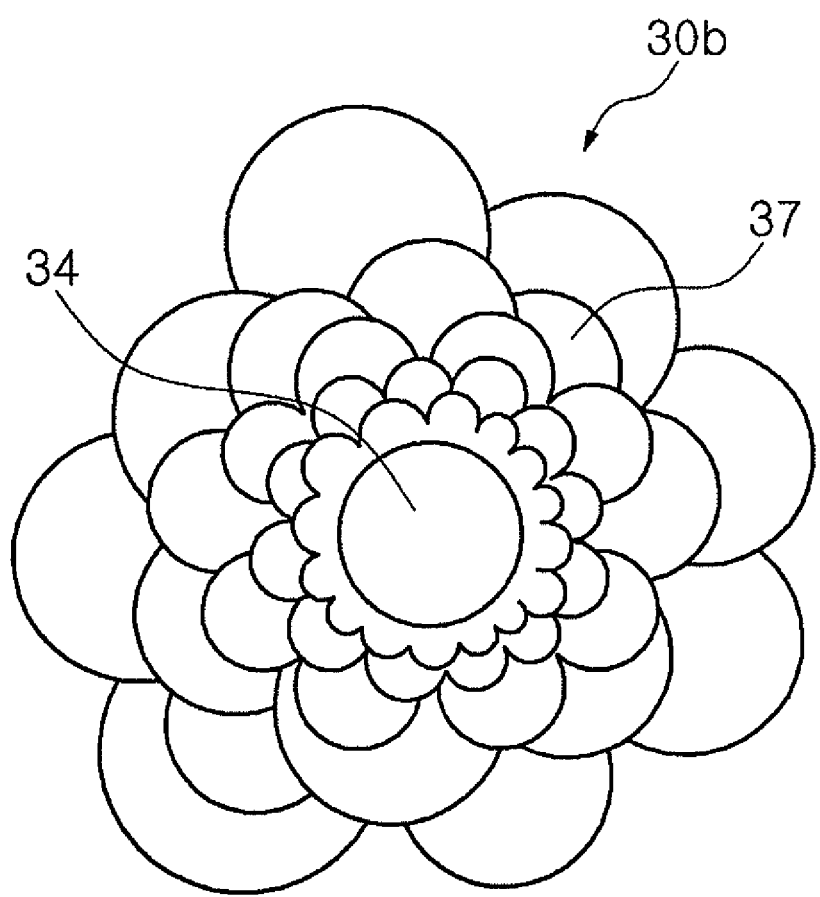

FIGS. 3A and 3B are cross-sectional views illustrating a pulse corona reactor 30b. In the pulse corona reactor 30b, a high voltage iron-core electrode 34 receiving applied-high voltage power is provided in a center of ground electrode 36 having a tube shape. When a high voltage of several KVs is applied to the high voltage iron-core electrode 34, a faint light emission effect can be shown on the periphery thereof, and this indicates a discharge occurrence. That is, an electrical field is generated on a surface of the high voltage iron-core electrode 34 and a pulse corona discharge 37 begins.

The pulse corona discharge 37 is directed from the high voltage iron-core electrode 34 toward ground electrode 36 and so the intensity of the electrical field is rapidly lowered, and positive ions generated on the surface of the high voltage iron-core electrode 34 are directed to the ground electrode 36 and move at a relatively low speed. At a portion the ions move, ionization or an excitation reaction of molecules is generated, and most of them have a light emission between the electrodes 36. Therefore, NOx is excited to positive ions and combined with oxygen and then can be changed into $NO_3$ based on a high water-solubility.

Furthermore, the pulse corona discharge 37 may be inappropriate for a large quantity of chemical industrial production, but when using the pulse corona discharge 37, ionic wind can be formed in air and molecular ions may be freely generated. By using such characteristic nature, particles floating in air can be charged to ions and may be integrated onto the high voltage iron-core electrode 34 by using high voltage.

As a result, in the air purifying apparatus according to embodiments of the inventive concept, NOx is excited and oxidized by using the pulse corona reactor 30b, thereby producing $NO_3$ and readily removing NOx from the air.

On the other hand, moisture having soluble $NO_3$ in air is eliminated by eliminator 40. The eliminator 40 can gather and eliminate $NO_3$ soluble in the moisture of the air. For example, the eliminator 40 may comprise a filter, bubbler or cooling plate. The filter may be a filtering net through which air is passed via air holes, and collects $NO_3$ contained in the air and water 60. The bubbler collects $NO_3$ and water 60 by bubbling air. The cooling plate collects the moisture of the air into water drops during cooling the air. The cooling plate has a plurality of air holes through which the air is passed. The cooling plate may be formed of, for example, Teflon material dominantly resisting to corrosion from an oxide solution, such as for example, $NO_3$. Thus, the water drops condensed from the moisture of the air in the eliminator 40 fall into a water tank 50.

An air purifying method in the air purifying apparatus according to an embodiment of the inventive concept is described as follows.

Figure 4:
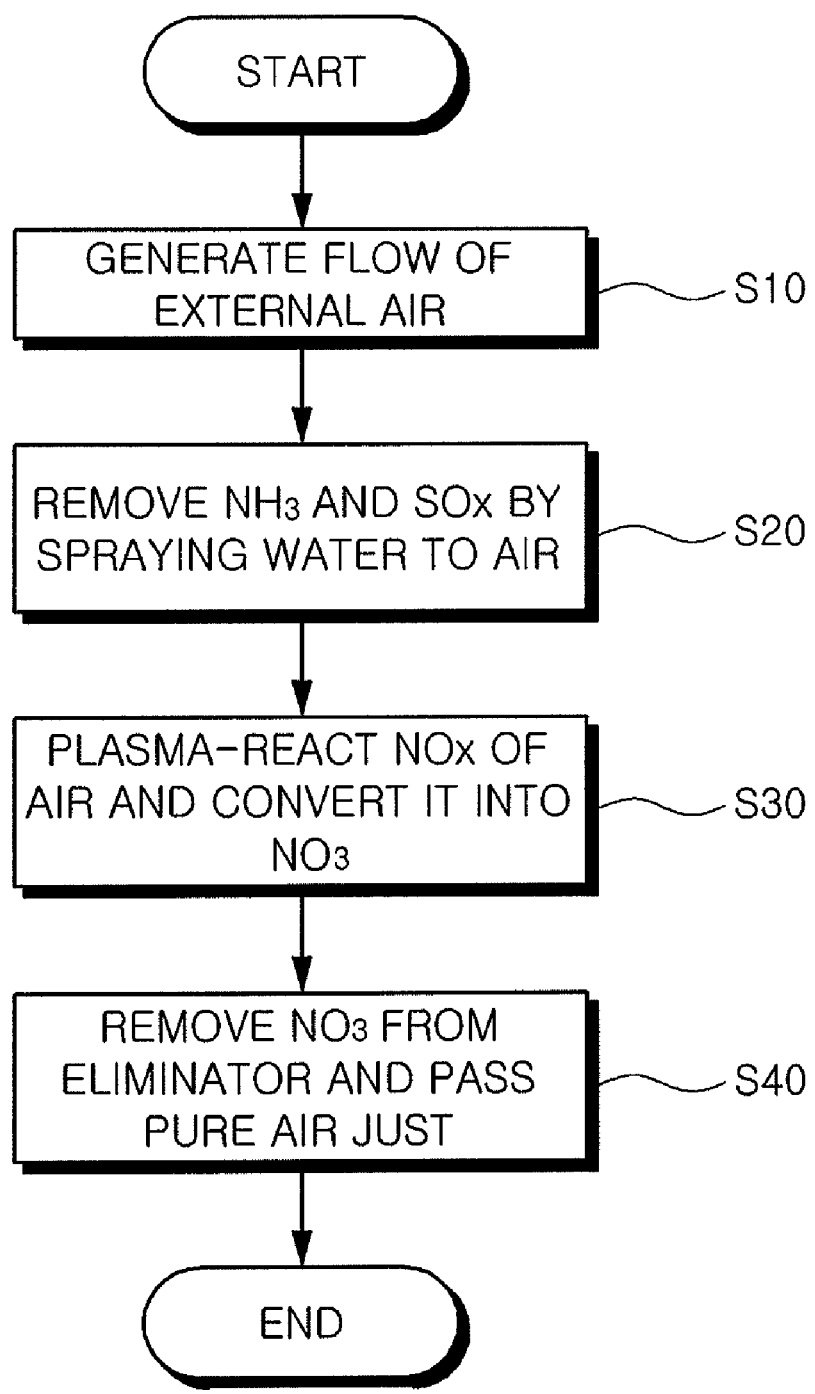
FIG. 4 is a flowchart providing an air purifying method according to an embodiment of the inventive concept.

FIG. 4 is a flowchart providing an air purifying method according to an embodiment of the inventive concept.

As shown in FIG. 4, in air purifying method according to an embodiment of the inventive concept, a portion of air in the outside atmosphere flows by a given pressure of fan 10 in a step S10. The air contains various kinds of chemical components, such as for example, $NH_3$, SOx and NOx, together with dust. Also, particles such as dust of air may be removed through a filter adaptable on the front or back of the fan 10.

Then, water 60 from a nozzle 20 is sprayed to air to remove $NH_3$, and SOx in a step S20. The water 60 sprayed from the nozzle 20 is dispersed in a shower type spray, not only removing $NH_3$ and SOx, but also heightening the humidity of the air. Accordingly, the air contains just NOx by practically eliminating $NH_3$ and SOx.

Figure 5:
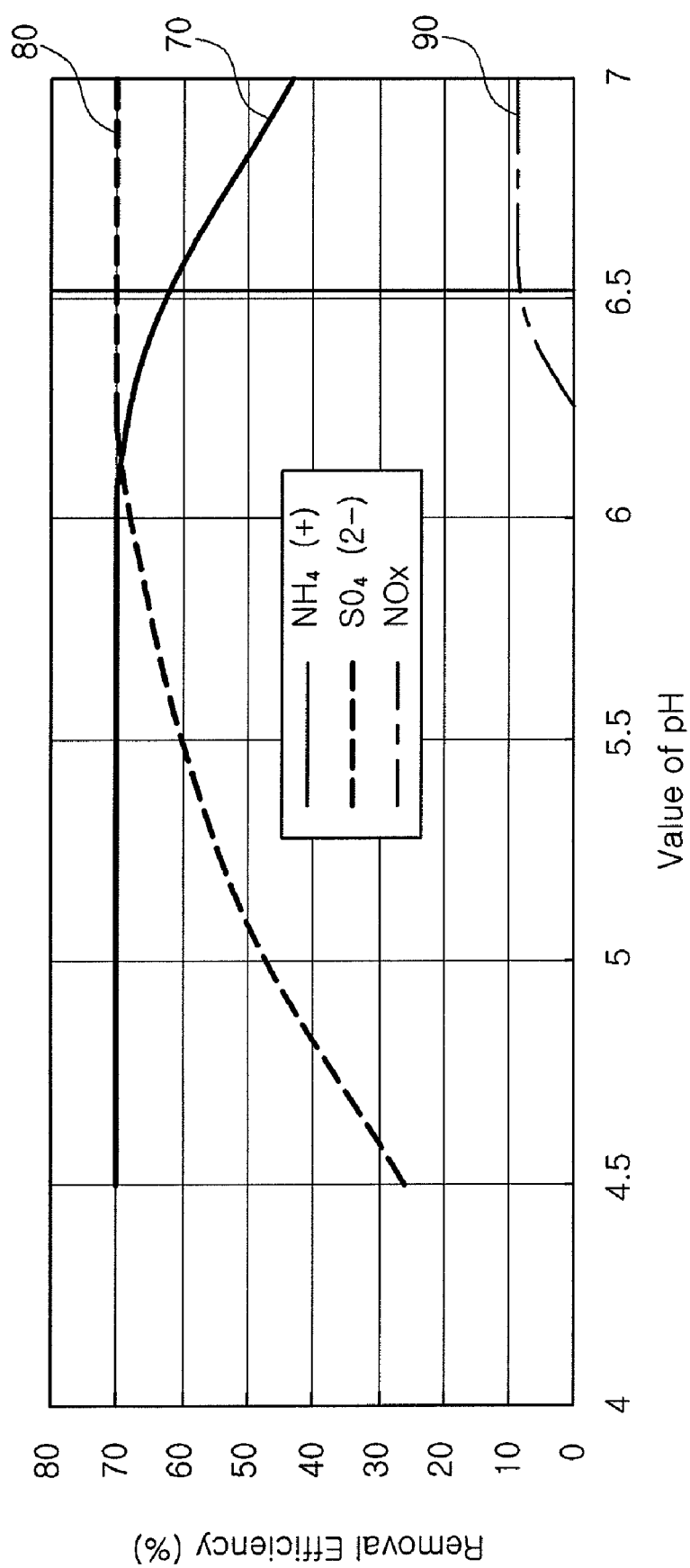
FIG. 5 is a graph showing a removal efficiency of chemicals based on the PH of water.

FIG. 5 is a graph showing a removal efficiency of chemicals based on PH of water 60. As shown in the graph, the removal efficiency of the chemicals in the air becomes different according to the PHs of the water 60 sprayed from nozzle 20. In FIG. 5, almost all of the chemicals can be readily removed by using water of weak alkalinity of approximately PH 6.5. $NH_3$ 70 has a removal efficiency of approximately 70% by using water 60 containing a soluble acid component with relatively low PH. On the other hand, SOx 80 has a removal efficiency of approximately 70% by using water 60 containing a soluble alkali component with relatively high PH. However, NOx 90 has a removal efficiency of approximately 10% or below even though water 60 containing a soluble alkali component with relatively high PH is used. In other words, it may be difficult to remove NOx 90 in air simply by controlling a value of PH. Therefore, NOx 90 may be physically decomposed and oxidized in a subsequent process.

Subsequently, NOx in air undergoes a plasma reaction and is converted into $NO_3$ in a step S30. The plasma reaction is to excite corresponding material into ions and electron state from gas, liquid or solid state under given conditions. During that, a portion of oxygen in air may be converted into ozone. Similarly, a portion of NOx may be separated into nitrogen and oxygen in the plasma state, or may be mostly combined with peripheral oxygen or ozone, and thus may be converted into $NO_3$. $NO_3$ receives hydrogen from moisture contained in air and then is converted into $HNO_3$, and thus is dissolved into the moisture. Accordingly, NOx is converted into $NO_3$ and is soluble in moisture of air.

Figure 6:
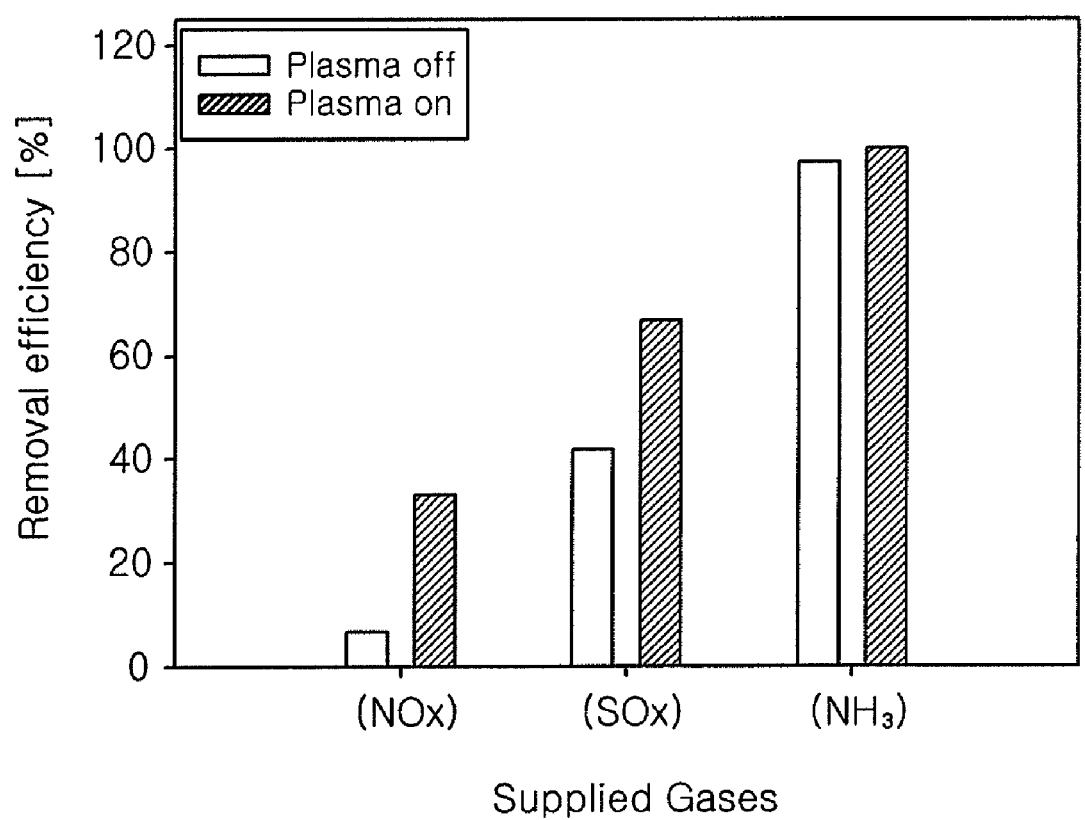
FIG. 6 is a graph of comparing chemical removal efficiency before and after a plasma reaction.

FIG. 6 is a graph of comparing chemical removal efficiency of before and after a plasma reaction, and NOx is processed by the plasma reaction. As illustrated in FIG. 6, the removal efficiency of NOx is increased by almost three times or more relatively when the NOx is processed by the plasma reaction. Further, SOx and $NH_3$ are processed by the plasma reaction, thereby minutely increasing the removal efficiency. Accordingly, NOx is processed by the plasma reaction in a wet removal using water 60, thereby increasing the removal efficiency of the NOx.

In a last process, $NO_3$ is removed through eliminator 40 and then just pure air is passed into clean room in a step S40. Air containing moisture having soluble $NO_3$ is cooled by the eliminator 40, thereby removing the moisture and purifying the air.

As a result, in the air purifying method according to an embodiment of the inventive concept, NOx is converted into $NO_3$ through the plasma reaction and becomes soluble in the moisture of the air and thus is removed.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. An apparatus for purifying air, comprising:
an air flow generating device for generating a flow of air;
a nozzle spraying water to the air flowing through the air flow generating device;
a plasma module performing a plasma reaction on the air containing the water sprayed from the nozzle, and oxidizing $NO_x$ in the air and converting it into $NO_3$;
an eliminator eliminating the $NO_3$ converted in the plasma module and the water contained in the air and passing pure air through the eliminator and out of the air purifying apparatus; and
a water tank storing the water received from the eliminator.

2. The apparatus of claim 1, wherein the plasma module generates a low-temperature atmospheric-pressure plasma reaction.

3. The apparatus of claim 2, wherein the plasma module comprises one of a dielectric barrier reactor or a pulse corona reactor.

4. The apparatus of claim 3, wherein the dielectric barrier reactor comprises a dielectric installed in one or all of a plurality of discharge electrodes having a given gap therebetween.

5. The apparatus of claim 3, wherein the pulse corona reactor comprises a high voltage iron-core electrode adapted to receive applied-high voltage, and a ground electrode having a tube shape.

6. The apparatus of claim 1, wherein the eliminator comprises one of a filter, a bubbler or a cooling plate collecting the $NO_3$ and the water.

7. The apparatus of claim 6, wherein the cooling plate comprises a plurality of air holes through which the air is passed.

8. The apparatus of claim 7, wherein the cooling plate of the eliminator collects moisture in the air into water drops during cooling of the air and the water drops condensed from moisture in the air in the eliminator fall into the water tank.

9. The apparatus of claim 1, wherein the air flow generating device is a fan.

10. The apparatus of claim 9, further comprising a filter disposed on a front or backside of the fan for removing dust and other particles contained in the air.

11. The apparatus of claim 1, wherein the water tank is located in a lower part of the eliminator and the nozzle.

12. A method of removing $NO_x$, comprising:
converting the $NO_x$ in air into $NO_3$ through a plasma reaction, wherein $NO_x$ is converted into the $NO_3$ in the plasma reaction b oxidizing the $NO_x$ using ozone to produce the $NO_3$ having a relatively high water solubility; and
then subsequently removing the $NO_3$ from the air.

13. The method of claim 12, wherein the $NO_3$ is collected by dissolving the $NO_3$ in the moisture of the air.

14. A method of purifying air, comprising:
generating a flow of air;
spraying water to the air;
performing a plasma reaction on the air containing the water, and oxidizing $NO_x$ in the air and converting it into $NO_3$; and
eliminating the water and the $NO_3$ contained in the air and passing pure air.

15. The method of claim 14, wherein the $NO_x$ is converted into the $NO_3$ in the plasma reaction by oxidizing the $NO_x$ using ozone to produce the $NO_3$ having a relatively high water solubility.

16. The method of claim 14, wherein the NOx is converted into the $NO_3$ in the plasma reaction by exciting the $NO_x$ to positive ions and combining with oxygen to produce the $NO_3$ having a relatively high water solubility.

17. The method of claim 14, wherein the water is sprayed to the air in the form of a fog spray.

* * * * *